(12) United States Patent
Brock et al.

(10) Patent No.: US 9,798,912 B1
(45) Date of Patent: Oct. 24, 2017

(54) IMAGING MODULE AND READER FOR, AND METHOD OF, READING TARGETS BY IMAGE CAPTURE WITH A SUBSTANTIALLY CONSTANT RESOLUTION OVER AN EXTENDED RANGE OF WORKING DISTANCES

(71) Applicant: Symbol Technologies, LLC, Lincolnshire, IL (US)

(72) Inventors: Christopher W. Brock, Manorville, NY (US); David T. Shi, Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/276,420

(22) Filed: Sep. 26, 2016

(51) Int. Cl.
G06K 7/10 (2006.01)
H04N 5/347 (2011.01)
H04N 5/345 (2011.01)
G06K 7/14 (2006.01)

(52) U.S. Cl.
CPC ....... *G06K 7/10722* (2013.01); *G06K 7/1413* (2013.01); *H04N 5/345* (2013.01); *H04N 5/347* (2013.01)

(58) Field of Classification Search
USPC ............................. 235/462.41, 462.1, 462.11
See application file for complete search history.

(56) References Cited

U.S. PATENT DOCUMENTS

| | | | | |
|---|---|---|---|---|
| 5,479,011 A | * | 12/1995 | Rudeen | G02B 5/005 235/462.23 |
| 5,814,803 A | * | 9/1998 | Olmstead | G06K 7/10702 235/454 |
| 6,021,946 A | * | 2/2000 | Hippenmeyer | G06K 7/10811 235/460 |
| 8,313,031 B2 | * | 11/2012 | Vinogradov | G03B 13/18 235/462.2 |

* cited by examiner

*Primary Examiner* — Ahshik Kim
(74) *Attorney, Agent, or Firm* — Yuri Astvatsaturov

(57) ABSTRACT

Targets are read by image capture with a substantially constant resolution over an extended range of working distances. Return light returning from a far-out target located at a far-out working distance is sensed by an array of pixels over a relatively narrow field of view, and over a relatively wide field of view when a close-in target is located at a close-in working distance. A controller processes the sensed return light from the far-out target only from a set of the pixels located in a central region of the array. For the close-in target, the controller groups all the pixels into bins, each bin having a plurality of the pixels, and processes the sensed return light from the close-in target from each of the bins.

20 Claims, 4 Drawing Sheets

IMAGING MODULE AND READER FOR, AND METHOD OF, READING TARGETS BY IMAGE CAPTURE WITH A SUBSTANTIALLY CONSTANT RESOLUTION OVER AN EXTENDED RANGE OF WORKING DISTANCES

BACKGROUND OF THE INVENTION

The present disclosure relates generally to an imaging module and an imaging reader for, and a method of, reading targets, such as bar code symbols, to be electro-optically read by image capture with a substantially constant resolution over an extended range of working distances away from the module/reader.

Solid-state imaging systems or imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes an imaging module, also known as a scan engine, that is mounted in a housing, and that typically has an illumination system for emitting illumination light toward the targets for reflection and scattering therefrom; and an imaging system having a solid-state imager, also known as an imaging sensor, with an array of light sensors or pixels, and an imaging lens assembly for capturing return illumination light scattered and/or reflected from the illuminated targets over a field of view, and for projecting the captured illumination light onto the imager to initiate capture of an image of each target. The imager produces electrical signals that are decoded and/or processed by a programmed microprocessor or controller into information related to each target being read, e.g., decoded data identifying each target. The controller is operative for transmitting the decoded data, either via a wireless or wired link, to a remote host for further processing, e.g., price retrieval from a price database to obtain a price for each identified target.

The known imaging lens assembly may be a fixed focus type and be comprised of a plurality or group of stationary lenses, such as a classical Cooke triplet having a center lens between a pair of side lenses. In order to image targets that can be located over an extended range of working distances relative to the reader, it is known to configure the fixed focus reader with different lens configurations having different focal lengths, each designed to focus at a different working distance. However, such multiple lens configurations are costly and not readily versatile across a broad range of applications.

The known imaging lens assembly may also be a variable focus type and be comprised of one or more movable lenses, which are moved, for example, by a voice coil motor, to automatically focus a target between a near or close-in working distance close to the reader and a remote or far-out working distance further away from the reader. However, this mechanical lens movement is disadvantageous for several reasons. First, the mechanical lens movement generates vibrations which, in the case of a handheld reader, may be propagated through the reader to the user's hand, may generate dust to obscure the lenses, and may generate an objectionable, annoying, audible hum. In addition, the voice coil motor is very susceptible to hand motion, consumes electrical power, is expensive and notoriously slow, can be unreliable, occupies space, and increases the overall weight, size and complexity of the reader.

Another problem associated with the known imaging readers relates to the resolution or detail in which the image of each target is captured. A far-out target located at the far-out working distance is best read by the imager with a high resolution over a relatively narrow field of view, because the apparent size of the far-out target is relatively small. A close-in target located at the close-in working distance is best read by the imager over a relatively wide field of view, because its apparent size is relatively large, and a high resolution for the imager is not needed due to the close proximity of the close-in target. A multi-megapixel imager could provide the high resolution for the far-out target, but such an imager is not only expensive, but dealing with such a large number of pixels slows down the frame rate of the imager and also slows down the processing of the electrical signals to be decoded and processed. Such time delays negatively impacts the aggressiveness of the reader and may render its performance as too sluggish in many applications.

Accordingly, it would be desirable to electro-optically and expeditiously read targets by image capture over an extended range of working distances at a substantially constant resolution.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
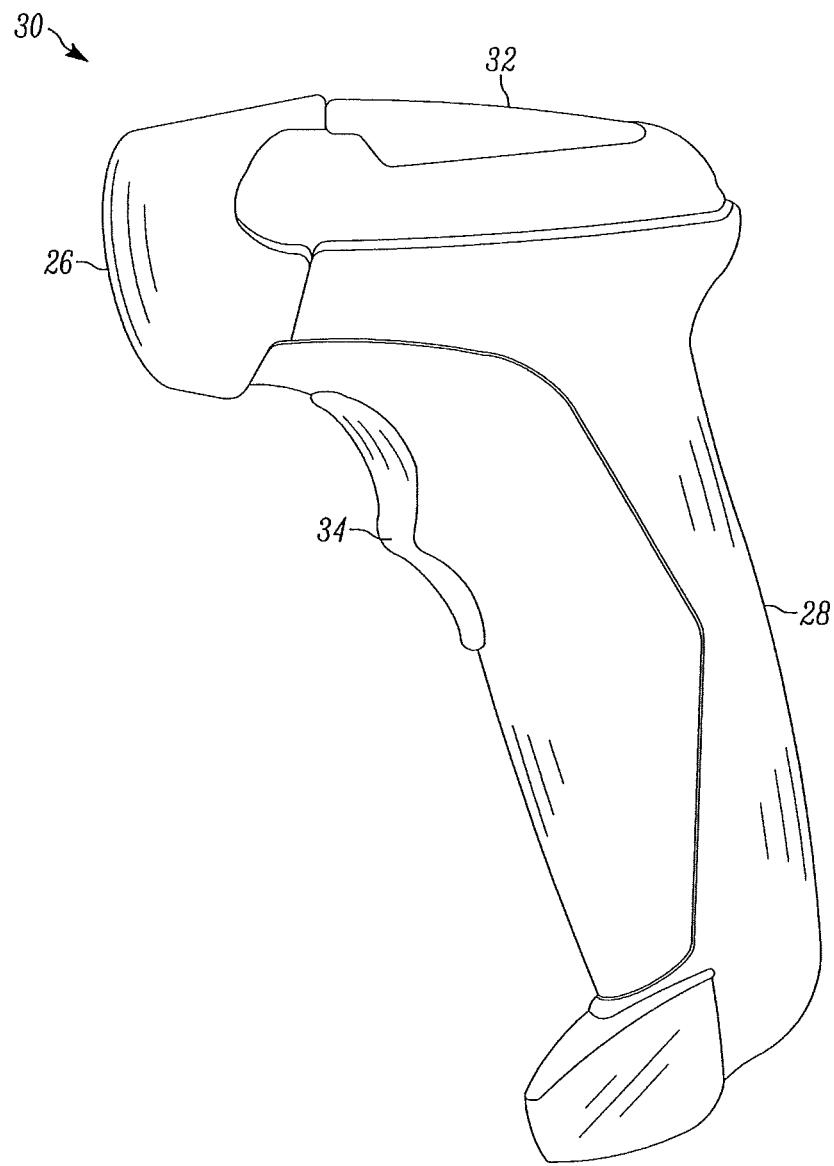
FIG. 1 is a perspective view of an exemplary embodiment of an electro-optical handheld reader for reading targets by image capture in which an imaging module is mounted in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The module, reader and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging module is operative for electro-optically reading targets, e.g., bar code symbols, by image capture with a substantially constant resolution over an extended range of working distances away from the module. The module includes an imaging system that has an imaging sensor, e.g., a two-dimensional, solid-state device, such as a charge coupled device (CCD) or a complementary metal oxide semiconductor (CMOS) device, having an array of pixels for sensing return light returning from a far-out target located at a far-out working distance relative to the module over a relatively narrow field of view, and from a close-in target located at a close-in working distance relative to the module over a relatively wide field of view. Preferably, the pixels extend along mutually orthogonal, horizontal and vertical axes for sensing the return light returning from the targets along an imaging axis that is generally perpendicular to the horizontal and vertical axes. Advantageously, the pixels are arranged in a predetermined number of linear rows that are generally parallel to the horizontal axis, and in a predetermined number of linear columns that are generally parallel to the vertical axis.

The module also includes a controller that is operatively connected to the imaging system. The controller processes the sensed return light from the far-out target only from a set of the pixels located in a central region of the array. Advantageously, the set of the pixels located in the central region of the array constitutes a number of rows less than said predetermined number of rows, and a number of columns less than said predetermined number of columns. The controller also processes the sensed return light from the close-in target by grouping all the pixels into bins, each bin having a plurality of the pixels, and by processing the sensed return light from the close-in target from each of the bins. Each bin constitutes a single effective pixel that is larger than each individual pixel. The controller processes the sensed return light from the close-in target at a predetermined frame rate, and processes the sensed return light from the far-out target at a frame rate greater than the predetermined frame rate. Preferably, a ranging system is employed to determine the working distance to each target.

In accordance with another feature of this disclosure, the aforementioned imaging module is mounted in a housing of an imaging reader that has a light-transmissive window. The imaging sensor senses light returning from the target through the window. The housing is preferably embodied as a portable, point-of-transaction, gun-shaped, handheld housing, but could be embodied as a handheld, box-shaped housing, or any other configuration including a hands-free configuration.

In accordance with yet another feature of this disclosure, a method of electro-optically reading targets by image capture with a substantially constant resolution over an extended range of working distances away from an array of pixels of an imaging sensor, is performed by sensing return light returning from a far-out target located at a far-out working distance relative to the array over a relatively narrow field of view, and from a close-in target located at a close-in working distance relative to the array over a relatively wide field of view, and by processing the sensed return light from the far-out target only from a set of the pixels located in a central region of the array. The method is further performed by processing the sensed return light from the close-in target by grouping all the pixels into bins, each bin having a plurality of the pixels, and by processing the sensed return light from the close-in target from each of the bins.

Figure 2:
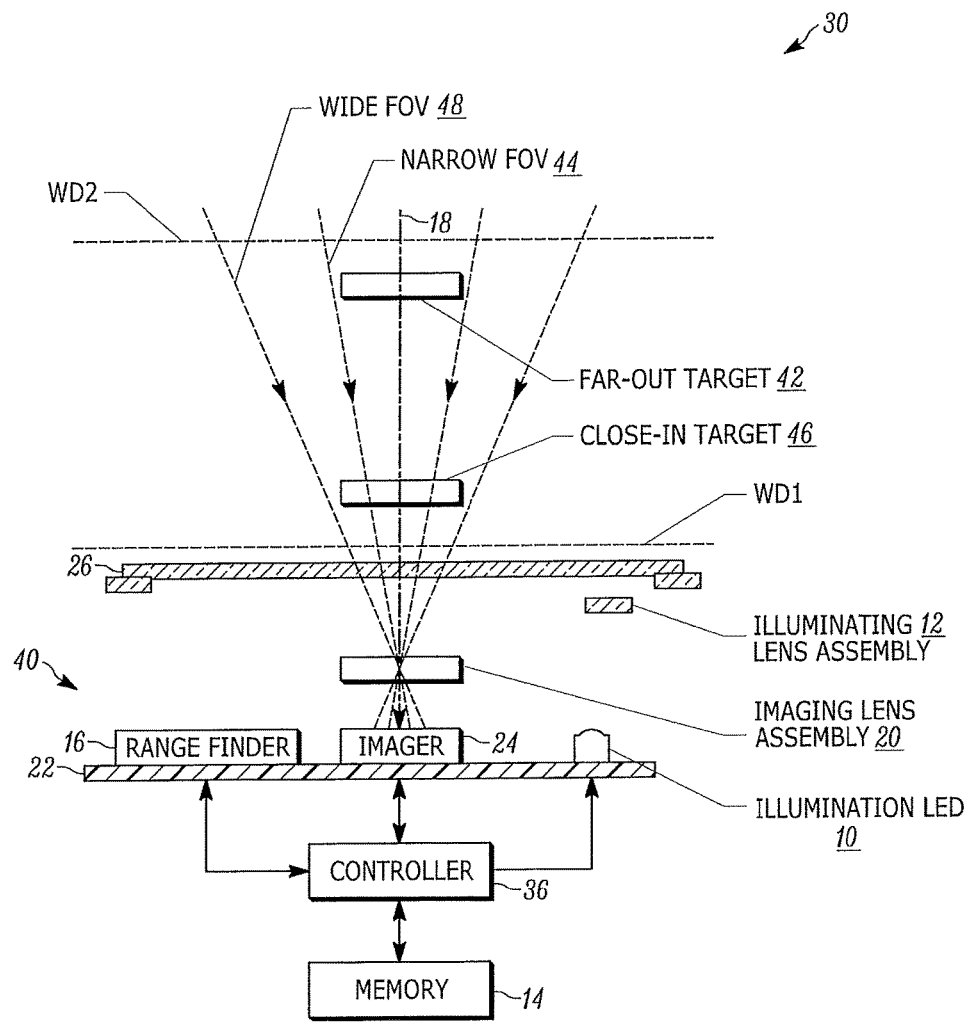
FIG. 2 is a diagrammatic view of components of imaging, illuminating, and ranging systems onboard the imaging module within the reader of FIG. 1 for reading the targets over an extended range of working distances.

Turning now to the drawings, reference numeral 30 in FIG. 1 generally identifies a handheld imaging reader for electro-optically reading targets, such as bar code symbols or like indicia. The reader 30 includes a housing 32 in which an imaging or scan engine or imaging module 40, as described in detail below in connection with FIG. 2, is mounted. The housing 32 includes a generally elongated, tilted handle or lower handgrip portion 28, and a barrel or upper body portion having a front end at which a light-transmissive window 26 is located. The cross-sectional dimensions and overall size of the handle 28 are such that the reader 30 can conveniently be held in an operator's hand. The body and handle portions may be constructed of a lightweight, resilient, shock-resistant, self-supporting material, such as a synthetic plastic material. The plastic housing 32 may be injection molded, but can also be vacuum-formed or blow-molded to form a thin hollow shell which bounds an interior space whose volume is sufficient to contain the imaging module 40. A manually actuatable trigger 34 is mounted in a moving relationship on the handle 28 in a forward facing region of the reader 30. An operator's forefinger is used to actuate the reader 30 to initiate reading by depressing the trigger 34. Although the housing 32 has been illustrated as a portable, point-of-transaction, gun-shaped, handheld housing, this is merely exemplary, because the housing could also be embodied as a handheld, box-shaped housing, or with any other configuration including a hands-free configuration.

As schematically shown in FIG. 2, the imaging module 40 includes an imaging system that has an imaging sensor or imager 24 mounted on a printed circuit board (PCB) 22 in the reader 30, and an imaging lens assembly 20 positioned in front of the imager 24. The imager 24 and the imaging lens assembly 20 are preferably aligned along a centerline or an optical imaging axis 18 generally centrally located within the upper body portion of the housing 32. The PCB 22 is preferably mounted within the tilted handle 28. The imager 24 is a solid-state device, for example, a charge coupled device (CCD), or a complementary metal oxide semiconductor (CMOS) device. The imager 24 has a two-dimensional array of addressable image sensors or pixels arranged in mutually orthogonal rows and columns, as described below in connection with FIGS. 3-4, which extend parallel to the illustrated mutually orthogonal, horizontal X-X and vertical Y-Y axes. The imaging lens assembly 20 preferably comprises one or more variable focus lenses.

As also shown in FIG. 2, in operation, the array of pixels sense return light returning from a far-out target 42 located at a far-out working distance WD2 relative to the module 40 over a relatively narrow field of view (FOV) 44, and from a close-in target 46 located at a close-in working distance WD1 relative to the module 40 over a relatively wide FOV 48. In a preferred embodiment, WD1 is about one-half inch from the window 26, and WD2 is about thirty inches and more from the window 26. The imaging lens assembly 20 is located remotely from the window 26, for example, about forty millimeters away. The return light is scattered and/or reflected from each target over its respective FOV. The imaging lens assembly 20 captures the return light that passes along the imaging axis 18 through the window 26, and projects the captured return light onto the array of pixels. Each FOV is generally rectangular and extends along the aforementioned mutually orthogonal, horizontal and vertical axes that are generally perpendicular to the imaging axis 18.

An illuminating light system may also be mounted in the module 40 and includes an illumination light source, e.g., a light emitting diode (LED) 10, preferably mounted on the PCB 22, and an illuminating lens assembly 12 configured to efficiently generate a pattern of illumination light on and along each target to be read by image capture. At least part of the scattered and/or reflected return light is derived from the pattern of illumination light on and along each target. A ranging system may also be mounted in the module 40 and includes a range finder 16 to determine the working distance to each target to be read. The range finder 16 can, for example, emit a laser or light beam, or an ultrasonic signal, to the target, and measure the working distance by determining when a return or echo signal is received.

As further shown in FIG. 2, the imager 24, the range finder 16, and the illumination LED 10 are operatively connected to a controller or programmed microprocessor 36 operative for controlling the operation of these components. A memory 14 is connected and accessible to the controller 36. In operation, the controller 36 sends command signals to energize the range finder 16 to determine the working distance to the target, and also energizes the illumination LED 10 for a short exposure time period, say 500 microseconds or less, and also energizes and exposes the imager 24 to collect the return light, e.g., illumination light and/or ambient light, from the target only during said exposure time period. A typical array needs about 18-33 milliseconds to acquire the entire target image and operates at a frame rate of about 30-60 frames per second. The pixels produce electrical signals corresponding to a two-dimensional image of the target. The electrical signals are processed by the controller 36 into data indicative of the target being read, and the data may be stored in the memory 14, or uploaded to a remote host for further processing. The controller 22 and the memory 36 may be mounted on the PCB 22, which is supported by the module 40.

Resolution of the imager 24 can be of various sizes. In a preferred embodiment, a 4 megapixel (MP) resolution of 2272 pixels in width along the horizontal axis by 1704 pixels in height along the vertical axis is used, with each pixel occupying a square area of about 2 microns. These pixels are thus arranged in a predetermined number of linear rows along the horizontal axis, and in a predetermined number of linear columns along the vertical axis. A simplified version of the mutually orthogonal rows and columns of the imager array is depicted in FIGS. 3-4.

As described above, the resolution at which the target image is captured varies over the working distance range. A far-out target is best read by the imager with a high resolution, whereas a close-in target is better read with a low resolution. One aspect of this disclosure is to read the targets with a substantially constant resolution over the working distance range.

Figure 3:
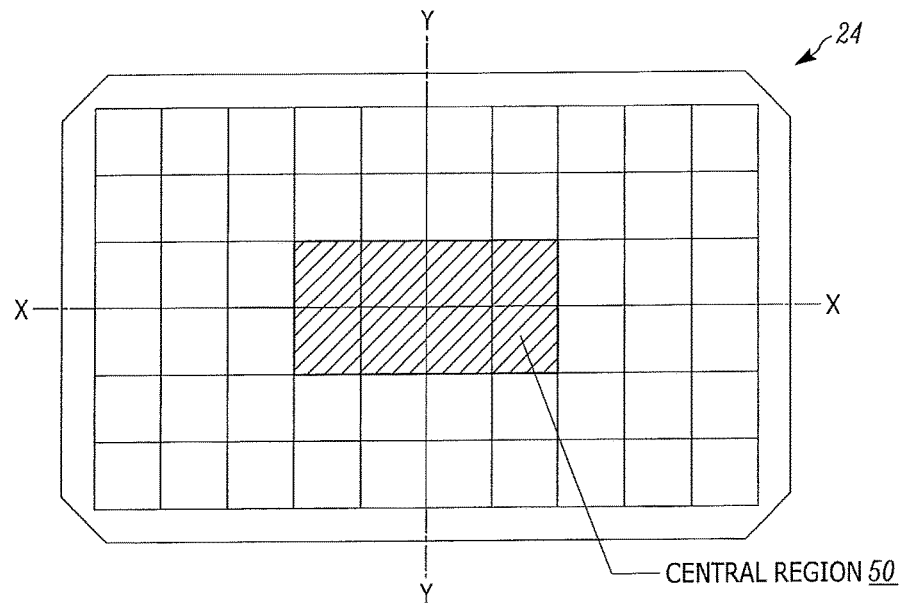
FIG. 3 is an enlarged, front view of an array of the imager of FIG. 2, and diagrammatically depicts a set of the pixels located in a central region of the array, for reading a far-out target at a predetermined resolution in accordance with this disclosure.

To this end, the controller 36 is operated to process the sensed return light from the far-out target 42 only from a set of the pixels located in a central region 50 of the array, as diagrammatically depicted by the shaded area in FIG. 3. The controller 36 is operated to ignore or discard the return light sensed by pixels located outside the central region 50. This set of the pixels located in the central region 50 constitutes a number of rows less than the aforementioned predetermined number of rows, and a number of columns less than the aforementioned predetermined number of columns. By way of numerical example, if the central region 50 occupies one-fourth of the entire area of the array of the 4MP imager, then the resolution of the captured image is 1MP.

Figure 4:
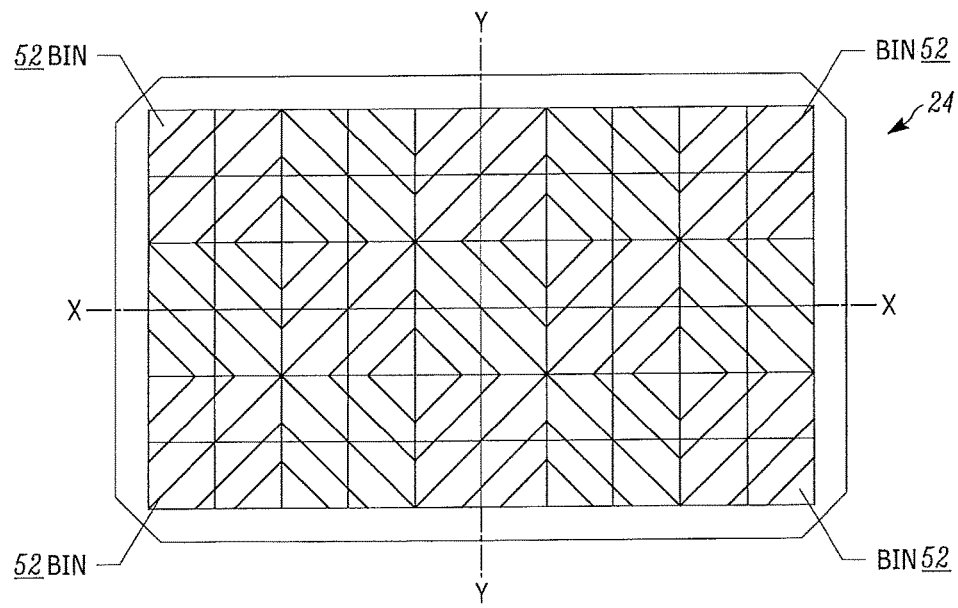
FIG. 4 is an enlarged, front view of the array of the imager of FIG. 3, and diagrammatically depicts all the pixels grouped into bins, for reading a close-in target at substantially the same predetermined resolution in accordance with this disclosure.

The controller 36 is further operated to process the sensed return light from the close-in target 46 by grouping all the pixels into bins, as diagrammatically depicted by the shaded areas 52 in FIG. 4. Each bin 52 has a plurality of the pixels. As illustrated, each bin 52 includes 4 individual or native pixels. Each bin 52 constitutes a single effective pixel that is larger than each individual pixel. The controller 36 processes the sensed return light from the close-in target 46 at a predetermined frame rate, and processes the sensed return light from the far-out target 42 at a frame rate greater than the predetermined frame rate due to the fewer number of pixels in the central region 50 as compared to the greater number of pixels in the entire array. The controller 36 processes the sensed return light from the close-in target 46 from each of the bins 52. By way of numerical example, if each bin 52 includes 2×2 or 4 native pixels, then each bin is effectively four times larger than each native pixel, and the resolution is one-fourth of the entire area of the array of the 4MP imager, in which case, the resolution of the captured image is again 1MP. Thus, the resolution is substantially the same for both far-out and close-in targets.

Figure 5:
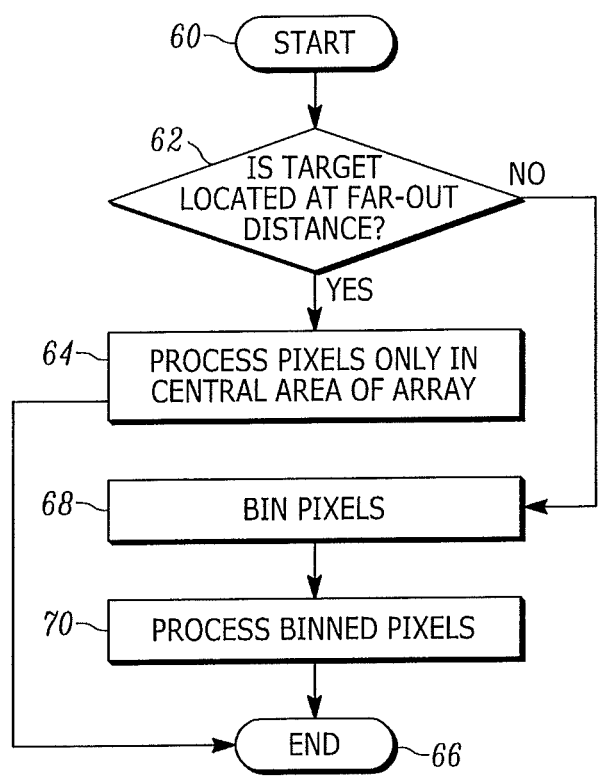
FIG. 5 is a flow chart of steps performed in a method of reading targets by image capture at a substantially constant resolution over an extended range of working distances in accordance with this disclosure.

As shown in the flow chart of FIG. 5, the method of electro-optically reading targets by image capture with a substantially constant resolution over an extended range of working distances away from the array of pixels of the imaging sensor 24, is performed, beginning at start step 60, by determining if the target is located at a far-out distance in decision step 62. If so, then the sensed return light from the far-out target 42 is processed only from the set of the pixels located in the central region 50 of the array in step 64 before ending in end step 66. If not, then all the pixels are grouped into the bins 52, each bin 52 having a plurality of the pixels in step 68, and then, the sensed return light from the close-in target 46 is processed from each of the bins 52 in step 70 before ending in end step 66.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a,"

or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the tem is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for electro-optically reading targets by image capture with a substantially constant resolution over an extended range of working distances away from the module, the module comprising:
    an imaging system including an imaging sensor having an array of pixels for sensing return light returning from a first target located at a first working distance relative to the module over a relatively narrow field of view, and from a second target located at a second working distance relative to the module over a relatively wide field of view, the second working distance being closer to the module than the first working distance; and
    a controller operatively connected to the imaging system and operative for processing the sensed return light from the first target only from a set of the pixels located in a central region of the array, and further operative for processing the sensed return light from the second target by grouping all the pixels into bins, each bin having a plurality of the pixels, and by processing the sensed return light from the second target from each of the bins.

2. The imaging module of claim 1, and a ranging system for determining the working distance to each of the targets to be read.

3. The imaging module of claim 1, wherein the pixels extend along mutually orthogonal, horizontal and vertical axes for sensing the return light returning from each of the targets along an imaging axis that is generally perpendicular to the horizontal and vertical axes; and wherein the pixels are arranged in a predetermined number of linear rows that are generally parallel to the horizontal axis, and in a predetermined number of linear columns that are generally parallel to the vertical axis.

4. The imaging module of claim 1, wherein the imaging system includes an imaging lens assembly for capturing the return light, and for projecting the captured return light onto the imaging sensor to initiate capture of an image of the target, and wherein the imaging lens assembly has a variable focus over the extended range of working distances.

5. The imaging module of claim 3, wherein the set of the pixels located in the central region of the array constitutes a number of rows less than said predetermined number of rows, and a number of columns less than said predetermined number of columns.

6. The imaging module of claim 1, wherein each bin constitutes a single effective pixel that is larger than each individual pixel.

7. The imaging module of claim 1, wherein the controller processes the sensed return light from the second target at a predetermined frame rate, and processes the sensed return light from the first target at a frame rate greater than the predetermined frame rate.

8. An imaging reader for electro-optically reading targets by image capture with a substantially constant resolution over an extended range of working distances away from the reader, the reader comprising:
    a housing having a light-transmissive window; and
    an imaging module mounted in the housing, the module having
        an imaging system including an imaging sensor having an array of pixels for sensing return light returning through the window from a first target located at a first working distance relative to the module over a relatively narrow field of view, and from a second target located at a second working distance relative to the module over a relatively wide field of view, the second working distance being closer to the module than the first working distance, and a controller operatively connected to the imaging system and operative for processing the sensed return light from the first target only from a set of the pixels located in a central region of the array, and further operative for processing the sensed return light from the second target by grouping all the pixels into bins, each bin having a plurality of the pixels, and by processing the sensed return light from the second target from each of the bins.

9. The imaging reader of claim 8, and a ranging system for determining the working distance to each of the targets to be read.

10. The imaging reader of claim 8, wherein the pixels extend along mutually orthogonal, horizontal and vertical axes for sensing the return light returning from each of the targets along an imaging axis that is generally perpendicular to the horizontal and vertical axes; and wherein the pixels are arranged in a predetermined number of linear rows that are generally parallel to the horizontal axis, and in a predetermined number of linear columns that are generally parallel to the vertical axis.

11. The imaging reader of claim 8, wherein the imaging system includes an imaging lens assembly for capturing the return light, and for projecting the captured return light onto the imaging sensor to initiate capture of an image of the target, and wherein the imaging lens assembly has a variable focus over the extended range of working distances.

12. The imaging reader of claim 10, wherein the set of the pixels located in the central region of the array constitutes a number of rows less than said predetermined number of rows, and a number of columns less than said predetermined number of columns.

13. The imaging reader of claim 8, wherein each bin constitutes a single effective pixel that is larger than each individual pixel.

14. The imaging reader of claim 8, wherein the controller processes the sensed return light from the second target at a predetermined frame rate, and processes the sensed return light from the first target at a frame rate greater than the predetermined frame rate.

15. A method of electro-optically reading targets by image capture with a substantially constant resolution over an extended range of working distances away from an array of pixels of an imaging sensor, the method comprising:

sensing return light returning from a first target located at a first working distance relative to the array over a relatively narrow field of view, and from a second target located at a second working distance relative to the array over a relatively wide field of view, the second working distance being closer to the module than the first working distance;

processing the sensed return light from the first target only from a set of the pixels located in a central region of the array; and processing the sensed return light from the second target by grouping all the pixels into bins, each bin having a plurality of the pixels, and by processing the sensed return light from the second target from each of the bins.

16. The method of claim 15, and determining the working distance to each of the targets to be read.

17. The method of claim 15, and configuring the pixels to extend along mutually orthogonal, horizontal and vertical axes for sensing the return light returning from each of the targets along an imaging axis that is generally perpendicular to the horizontal and vertical axes; and arranging the pixels in a predetermined number of linear rows that are generally parallel to the horizontal axis, and in a predetermined number of linear columns that are generally parallel to the vertical axis.

18. The method of claim 15, and capturing the return light, and projecting the captured return light onto the array to initiate capture of an image of the target, and varying a focus of the captured return light over the extended range of working distances.

19. The method of claim 17, and configuring the set of the pixels located in the central region of the array with a number of rows less than said predetermined number of rows, and with a number of columns less than said predetermined number of columns.

20. The method of claim 15, and configuring each bin as a single effective pixel that is larger than each individual pixel.

* * * * *